United States Patent [19]

Howse

[11] Patent Number: 4,993,850
[45] Date of Patent: Feb. 19, 1991

[54] DISC HARROW SUPPORT ASSEMBLY

[75] Inventor: Clovis J. Howse, Laurel, Miss.

[73] Assignee: Howse Implement Company, Inc., Laurel, Miss.

[21] Appl. No.: 479,537

[22] Filed: Feb. 13, 1990

[51] Int. Cl.$^5$ .......................... F16C 33/72; F16C 13/00
[52] U.S. Cl. ...................................... 384/477; 384/157; 384/460; 384/489
[58] Field of Search ............... 384/460, 474, 477, 489, 384/157

[56] References Cited

U.S. PATENT DOCUMENTS

| | | | |
|---|---|---|---|
| 3,111,351 | 11/1963 | Tanke | 384/460 |
| 3,141,710 | 7/1964 | Lehman | 384/477 |
| 4,173,262 | 11/1979 | Adee | 384/157 X |
| 4,296,977 | 10/1981 | Ladin | 384/157 |
| 4,726,696 | 2/1988 | Dickinson et al. | 384/477 |

FOREIGN PATENT DOCUMENTS 3009569 10/1980 Fed. Rep. of Germany ...... 384/460

Primary Examiner—Thomas R. Hannon
Attorney, Agent, or Firm—John J. Byrne; Bradford E. Kile

[57] ABSTRACT

A support for a disc narrow assembly wherein a standard ball bearing unit is utilized and is encased in a housing formed of opposing mirror image bushings which are further enclosed by a pair of opposing mirror image flange members that are releasably affixed to a vehicle carrier.

7 Claims, 3 Drawing Sheets

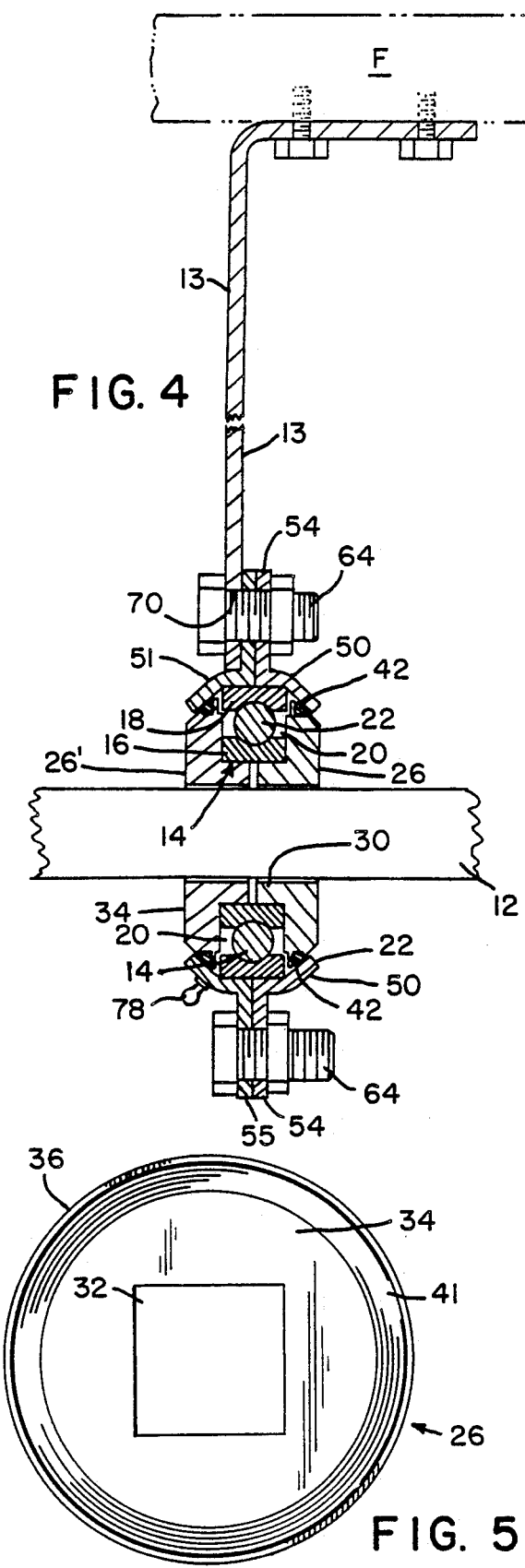
FIG. 4
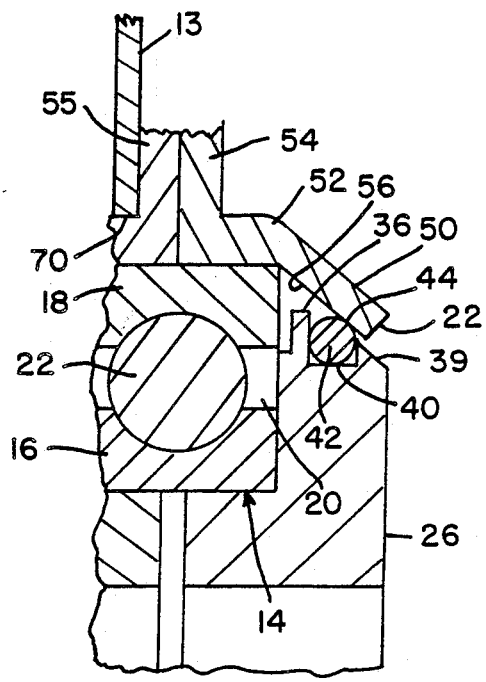
FIG. 4a
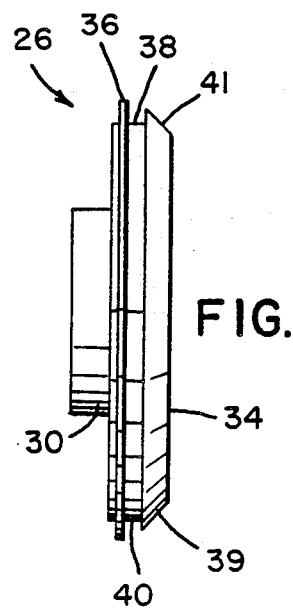
FIG. 6
FIG. 5

DISC HARROW SUPPORT ASSEMBLY

BACKGROUND OF THE INVENTION

The circular blades of a disc harrow are normally mounted on an elongated axle having a square cross-section. The axle is supported on the framework of a trailer or vehicle which pulls the harrow assembly through the ground to be treated by way of a suspension standard that is connected to the framework.

The environments in which harrows are used are almost always dusty and dirty. Therefore, the bearings for the supporting standards and the disc blades are expensive. This invention provides an easily manufactured bearing housing that can use off-the-shelf ball bearings.

FIELD OF THE INVENTION

The invention is believed to have its greatest usefulness in the agriculture arts and, in particular, in the field of harrowing.

A principal objective of the invention is to provide a bearing assembly for harrowing equipment that is rugged, less expensive than competitive devices, and is easy to assemble and disassemble.

Another objective of this invention is to provide a housing for a conventional ball bearing assembly which will shield the same from the difficult and dusty environment in which it is used.

A still further objective of the invention is to provide a bearing assembly which readily accepts a conventional grease fitting so that the grease which is in the bearing can be easily replaced.

Another objective of the invention is to provide a bearing housing for a ball bearing unit that is comprised of several mirror image components that are readily assembled and disassembled.

These and other objects of the invention will become more apparent to those skilled in the art by reference to the following detailed description when viewed in light of the accompanying drawings.

BRIEF DESCRIPTION OF THE DRAWINGS

FIG. 4 is a vertical cross-section of the assembly showing a support standard connected to a vehicle or trailer frame;

FIG. 4a is an enlarged view of a portion of FIG. 4;

FIG. 5 is a side view of a bushing element of this invention;

FIG. 6 is a side elevation of the bushing element shown in FIG. 5; and

DETAILED DESCRIPTION OF THE PREFERRED EMBODIMENT

Figure 1:
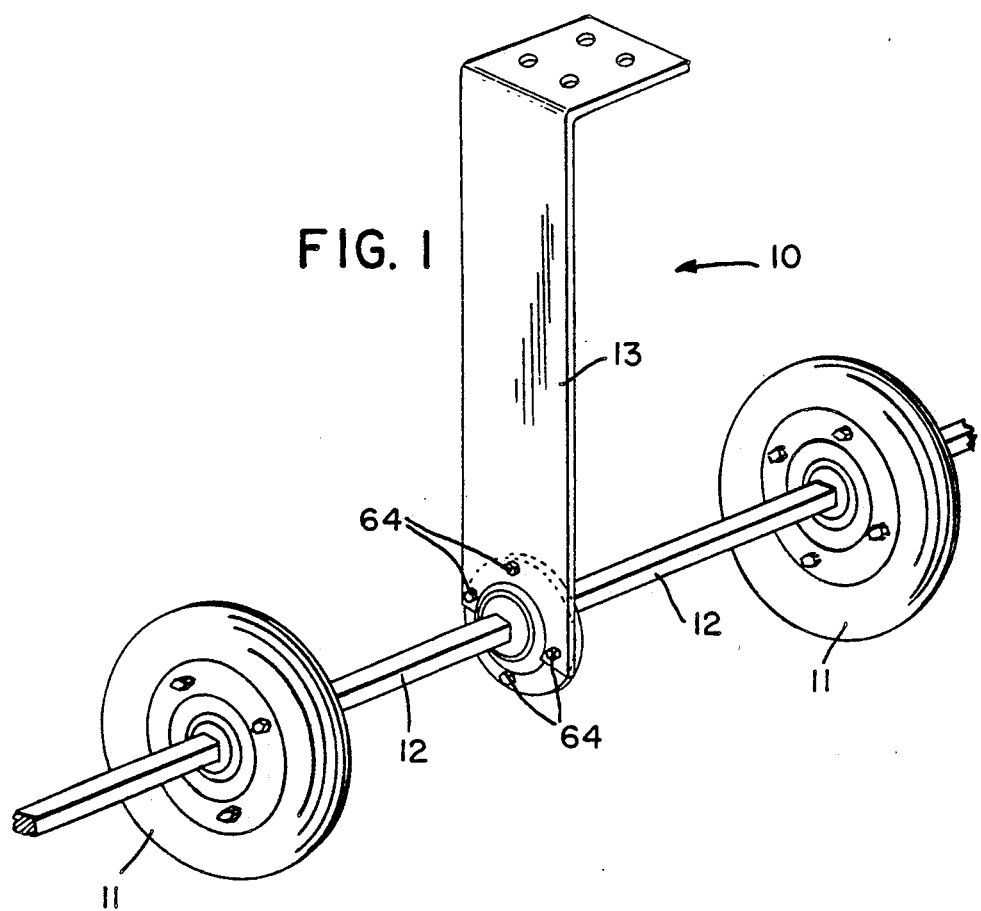
FIG. 1 is a perspective view of a disc harrow support standard and bearing seal assemblies on a rectangular axle.
Figure 2:
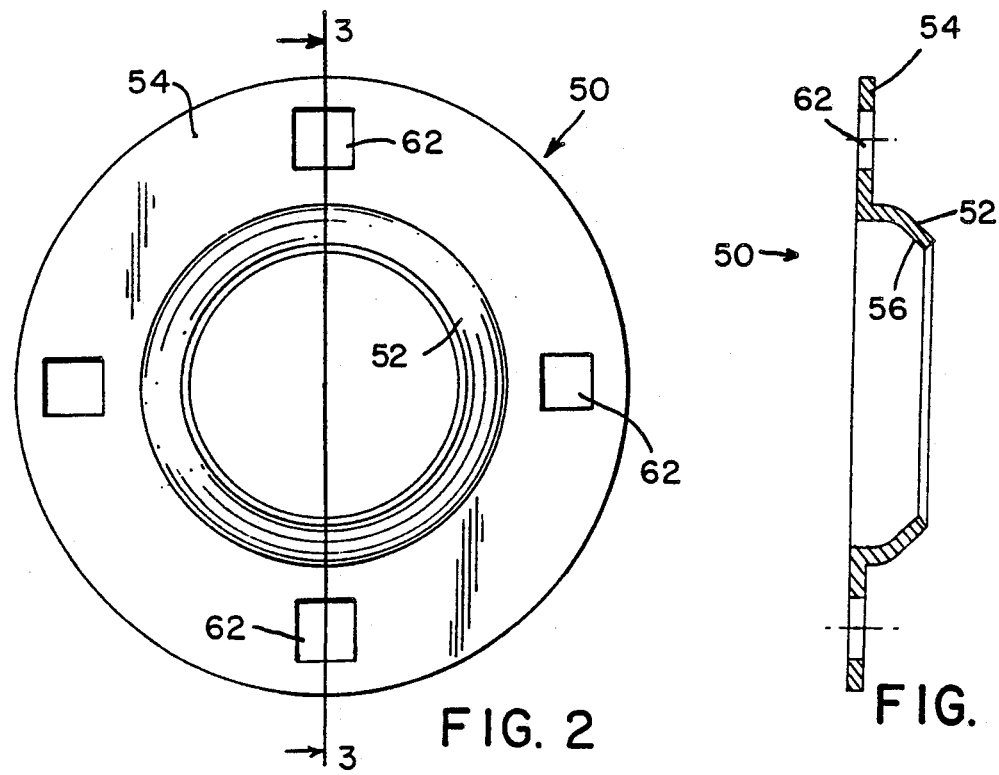
FIG. 2 is a side elevation view of one component of the sealing mechanism.

Referring now to the drawings wherein like elements refer to like parts, the disc harrow bearing assembly of this invention is generally indicated by the numeral 10. This assembly is normally mounted on a rectangular or square axle 12. In FIG. 1, only two harrow blades 11 are diagrammatically shown for purposes of clarity. It is to be understood, of course, that the axle 12 carries a plurality of spaced harrows in the conventional manner. The axle 12 is supported to the vehicle or trailer frame by way of a standard 13 that is bolted or otherwise secured to the frame F.

As seen best in FIG. 4, this invention provides a mechanism for housing a conventional ball bearing unit 14 in the mounting that carries the axle. The ball bearing 14 is comprised of an inner raceway 16 and an outer raceway 18 spaced therefrom in a manner to provide an annular opening 20 in which to receive a series of annularly arranged spherical bearings 22 therein.

The housing for the ball bearing unit 1 is generally provided by a pair of mirror image, pressed-in bushings 26 and 26'. The bushings are mirror images of one another. The bushing 26 as seen in FIGS. 5 and 6 is annular and has a cylindrical central portion 30 in which a square-shaped opening 32 is formed in which axle 12 is received. Extending outwardly from the central portion 30 of the bushing is a plate-like portion 34 having an annular ridge 36 defined in its periphery 38 in which an O-ring groove 40 is formed with another ridge 41. Within this groove 40 is an annular O-ring 42 having a dimension slightly larger than the groove 40 so that an exterior sealing surface 44 is presented. Since members 26 and 26' are mirror images, only member 26 has been awarded a complete set of numerals.

Figure 3:
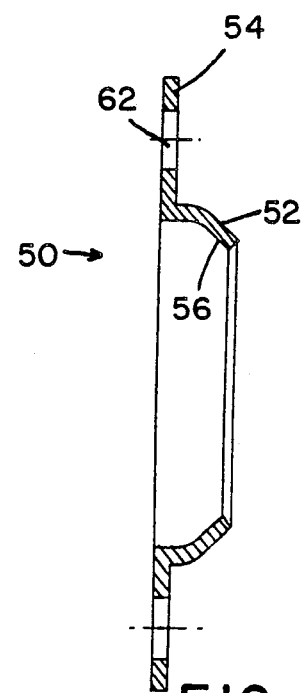
FIG. 3 is a cross section along line 3—3 of FIG. 2.

The housing for the bearing 14 is completed by a pair of flange members 50 and 51 (See FIG. 3). Again, these members 50 and 51 are mirror images of one another and only flange member 50 will be described in detail. As seen in FIG. 3, the flange member 50 has a central portion 52 to engage the outer raceway 16. Extending radially outwardly from central portion 52 is a peripheral flange 54. The central portion 52 is angled outwardly to the same extent that the bevel 39 of bushing 26 is angled inwardly. The angled portion has an inner surface 56 which engages the sealing surface of the O-ring 42.

Disposed exteriorly of the flanges 50 and 52, and integral therewith, the mounting rims 54 and 55 are disposed in a plane perpendicular to the axis of opening 32 and the axle 12. In the flanges are a plurality of openings 62 which are adapted to receive bolt and nut units 64.

Figure 7:
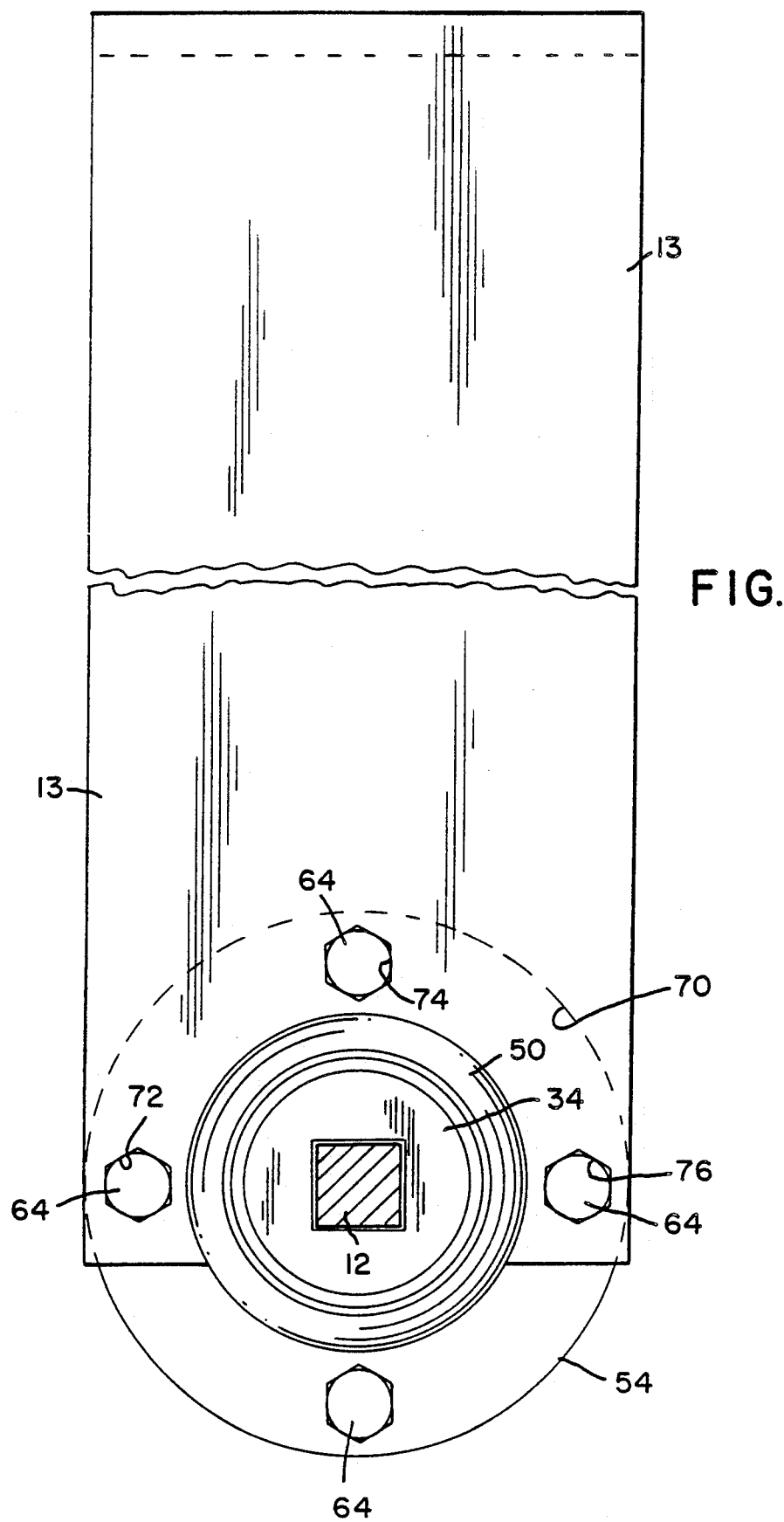
FIG. 7 is an enlarged side elevation of the supporting members.

As seen in FIGS. 4 and 7, the standard 13 is formed with a semi-circular cut-out 70 that receives the bearing housing. A plurality of apertures 72, 74, and 76 are disposed about the cut-out in locations that can be arranged in coaxial relationship with three of the openings 62. The housing is secured to the standard by way of the securing bolt and nut sets 64. The bolt and nut assemblies 64 secure the bearing assembly together as well as to standard 13.

Thus, it can be seen that a mounting has been provided for a harrow standard using conventional ball bearing assemblies. A conventional grease fitting 78 is provided in the flange 52 so that the bearing can be conventionally greased. As previously mentioned, the flange member and the bushings are comprised of two mirror image parts. The fact that the bushings and flange assemblies are separate elements facilitates the functioning and assembly of this apparatus.

In a general manner, while there has been disclosed a preferred embodiment of the invention, it should be understood that the invention is not limited to such an embodiment as there may be changes made in the arrangement, disposition and location of the parts without departing from the principle of the present invention as comprehended within the scope of the accompanying claims.

I claim:

1. A device for forming a sealed-in, regreasable housing for a standard ball bearing and for mounting a square axle shaft of a disc harrow to a frame standard thereto comprising:

an annular bushing means having a central opening to receive an axle and having an annular periphery;

first and second spaced ridges forming said periphery and defining an annular channel therebetween;

an annular ball assembly having an inner raceway, an outer raceway, and a plurality of intermediate ball bearings received in said channel and having an outer diameter such that an outer raceway extends at least partially beyond said periphery;

first and second edges, respectively, terminating said ridges;

a first annular groove in said first edge;

a second annular groove in said second edge;

first and second O-rings respectively located in said first and second grooves and said O-rings having a dimension so that a sealing surface extends beyond said grooves;

an annular flange means having an outer surface and an inner surface and said inner surface contacting said sealing surfaces of said O-rings and forming a housing for said ball bearing assembly;

a mounting rim extending radially outwardly from said outer surface in a plane substantially perpendicular to said axle; and means to mount said rim to a frame standard.

2. The invention of claim 1 wherein a grease fitting is formed in said annular flange means to permit the greasing and re-greasing of said housing.

3. The invention of claim 1 wherein said ridges are formed with bevels which extend axially and radially inward, and said annular flanage means is formed with portions having an angular bent approximating said angular disposition of said bevels.

4. The invention of claim 1 wherein said mounting rim and said harrow standard are formed with matching holes to receive retention bolts therethrough.

5. The invention of claim 1 wherein said annular bushing means is comprised of two mirror image pieces.

6. The invention of claim 1 wherein said flange means is comprised of two mirror image pieces.

7. The invention of claim 1 wherein said first and said second spaced ridges forming said periphery radially and longitudinally contacting said inner raceway of said annular ball bearing assembly and being radially and longitudinally spaced from contact with said outer raceway.

* * * * *